United States Patent [19]
Frigo et al.

[11] Patent Number: 5,625,733
[45] Date of Patent: Apr. 29, 1997

[54] ARRANGEMENT FOR INTERCONNECTING AN OPTICAL FIBER TO AN OPTICAL COMPONENT

[75] Inventors: Nicholas J. Frigo, Atlantic Highlands; Keith W. Goossen, Aberdeen; David A. B. Miller, Fair Haven; James A. Walker, Howell, all of N.J.

[73] Assignee: Lucent Technologies Inc., Murray Hill, N.J.

[21] Appl. No.: 385,946

[22] Filed: Feb. 9, 1995

[51] Int. Cl.$^6$ .................................................. G02B 6/42
[52] U.S. Cl. .................... 385/88; 385/78; 385/139
[58] Field of Search ..................... 385/76–78, 88–94, 385/123, 139

[56] References Cited

U.S. PATENT DOCUMENTS

| | | | |
|---|---|---|---|
| 4,818,056 | 4/1989 | Enochs et al. | 385/88 |
| 5,096,301 | 3/1992 | Stanley | 385/76 X |
| 5,276,754 | 1/1994 | Blair et al. | 385/88 |
| 5,345,530 | 9/1994 | Lebby et al. | 385/88 |
| 5,371,822 | 12/1994 | Horwitz et al. | 385/89 |
| 5,416,872 | 5/1995 | Sizer, II et al. | 385/92 |
| 5,434,940 | 7/1995 | Roff et al. | 385/91 |

OTHER PUBLICATIONS

AT&T Network Systems, *Lightguide Fiber Optic Cable and Apparatus Catalog*, 1991, pp. 4–11 through 4–17. Connectors shown on pages 4–11 and 4–12 are cited in application; technological background of the invention [no month].

*Primary Examiner*—John D. Lee

[57] ABSTRACT

An optical subsystem arrangement enables the electrical conductive or non-conductive bonding of an optical device to ferrules containing an optical fiber or to the optical fiber itself. In one embodiment, one or more contacts deposited on an end-face of the ferrule is bonded to one or more contacts on the optical component. Another embodiment is an opto/electrical connector for interconnecting an optical fiber through an optoelectronic component to one or more electrical facilities. Another arrangement enables the interconnecting of a plurality of optical devices to a plurality of optical fibers.

21 Claims, 7 Drawing Sheets

5,625,733

ARRANGEMENT FOR INTERCONNECTING AN OPTICAL FIBER TO AN OPTICAL COMPONENT

TECHNICAL FIELD

The present invention relates to optical fiber connection arrangements and, more particularly, to a method and apparatus for interconnecting an optical fiber and an optical component.

BACKGROUND OF THE INVENTION

The use of optical fiber as an information transport medium allows for rugged, high-speed, noise-immune, low-power data communications over long distances. Even though coaxial cable and optical fiber are comparable in cost per foot, optical fiber has not been utilized for short- to medium-haul applications due to the high cost of providing connections at the fiber ends. One reason for the high cost is the critical tolerances needed for alignment of optoelectronic components to optical fibers which is necessary to provide high-performance interconnections to electronic switching and information processing machines and computers. Thus, there is a continuing need to improve the technology for interconnecting optical fibers to optoelectronic components.

SUMMARY OF THE INVENTION

The apparatus and method of the present invention recognizes that there is an inherent advantage to providing an inexpensive optical subsystem arrangement which can be utilized directly with optical fibers. In particular, the arrangement bonds an optical device (e.g., optoelectronic device) directly to ferrules containing an optical fiber or to the optical fiber itself, thereby greatly reducing packaging costs compared to existing connection techniques.

According to one embodiment of the invention, at least one contact is deposited on an end-face of a ferrule so as not to substantially affect light being coupled to or from an optical fiber. An optical component having at least one contact is then bonded to the at least one contact portion of the end-face so as to enable light to be coupled between the optical component and the optical fiber.

Another embodiment of the invention is an opto/electrical connector apparatus for interconnecting an optical fiber to one or more electrical facilities. Another arrangement enables the interconnecting of a plurality of optical devices to a plurality of optical fibers.

DETAILED DESCRIPTION

The drawings of the various figures are not necessarily to scale and contain dimensional relationships which are exaggerated to aid in the clarity of the description.

In the following description, elements of each figure have reference designations associated therewith, the most significant digit of which refers to the figure in which that element is first referenced and described (e.g., 100 is first referenced in FIG. 1 ).

Figure 1:
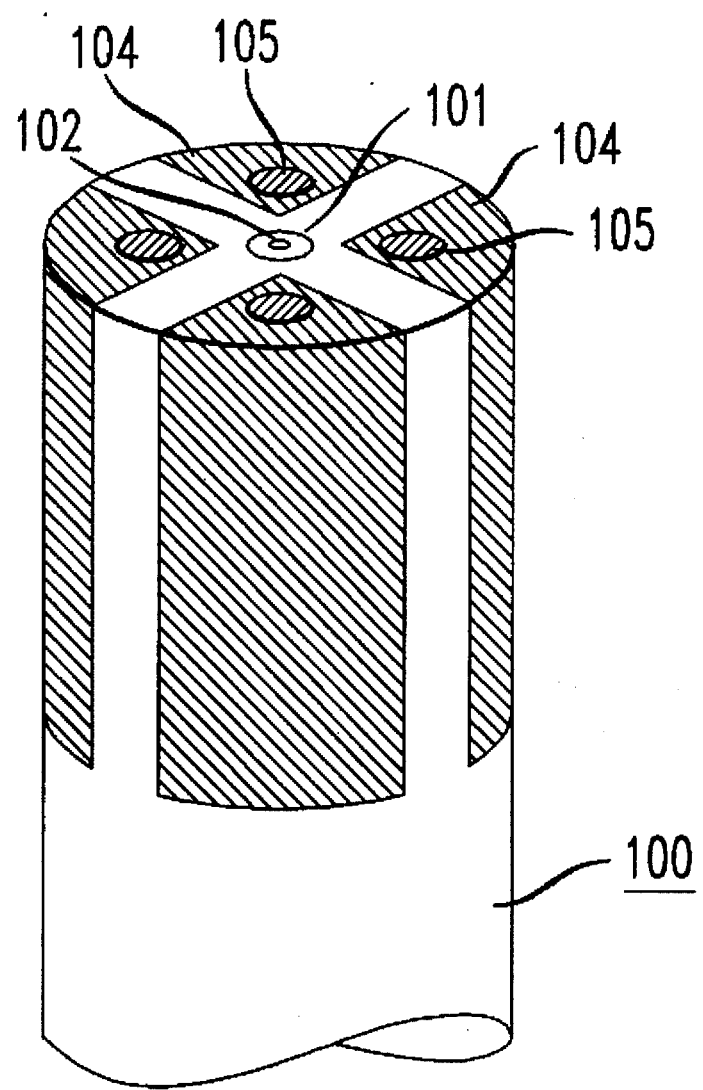
FIG. 1 shows an optical fiber ferrule having metallized contacts deposited over the face of a ferrule in accordance with the present invention.

Shown in FIG. 1 is one end of a ferrule 100 including an optical fiber 101 located therein. Onto the end of ferrule 100 has been deposited, in accordance with the present invention, one or more metallized electrical contacts 104 (illustratively four contacts are shown). While the present invention will be described as using metallized electrical contacts 104, it should be understood that contacts 104 need not be electrical or metallic in nature and may be used only for alignment purposes. More generally, the purpose of the contacts 104 is to provide mechanical bonding, optical alignment when necessary, and electrical contact when necessary. The optical fiber 101 includes core 102 for carrying light signals. The optical fiber 101 may, illustratively, be a single-mode or multi-mode optical fiber. Typically, a single-mode optical fiber contains a core which has a diameter of about 8 micro meters (with a tolerance of about plus or minus 1 micro meter) and a glass cladding having a diameter of 125 micro meters. A typical multi-mode optical fiber contains a core which has a diameter of about 62.5 micro meters (with a diameter tolerance of about plus or minus 3 or 4 micro meters) and a glass cladding having a diameter of about 125 micro meters. Ferrules are typically 1 to 3 millimeters in diameter.

The metallized contacts 104 are deposited on a polished or cleaved end-face and along a portion of the length of the ferrule 100 so as not to substantially affect the light that is coupled to or from the core 102. The number of contacts 104 utilized, as will be described in a later paragraph, depends on the application and the type of optical (or optoelectronic) device which is to be bonded to the contacts 104. As shown, the contacts 104 have a portion deposited on the end-face of the ferrule and another connected portion extending along a section of the length of the ferrule. An optical device would connect to contact areas 105 formed on contacts 104. These contact areas 105 enable the alignment of the optical device to the optical fiber core 102 as well as provide needed electrical connection to the optical device. As will be described in a later paragraph, the portion of the contacts 104 extending along the length of the ferrule provide contact areas for electrical connections that are needed for the optical device that is to be mounted to the contacts 104.

In accordance with one illustrative embodiment, the contacts 104 can be formed by depositing aluminum on the ferrule face. The contact areas 105 may be formed by depositing gold (or some other metal that is wettable to solder) onto the aluminum contacts 104. Alternatively, the contact areas 105 can be metallized with a solder material. The contacts 104 can be formed using well-known metal deposition techniques, such as thermal or E-beam evaporation, using a shadow mask to define the desired contact pattern.

Figure 1A:
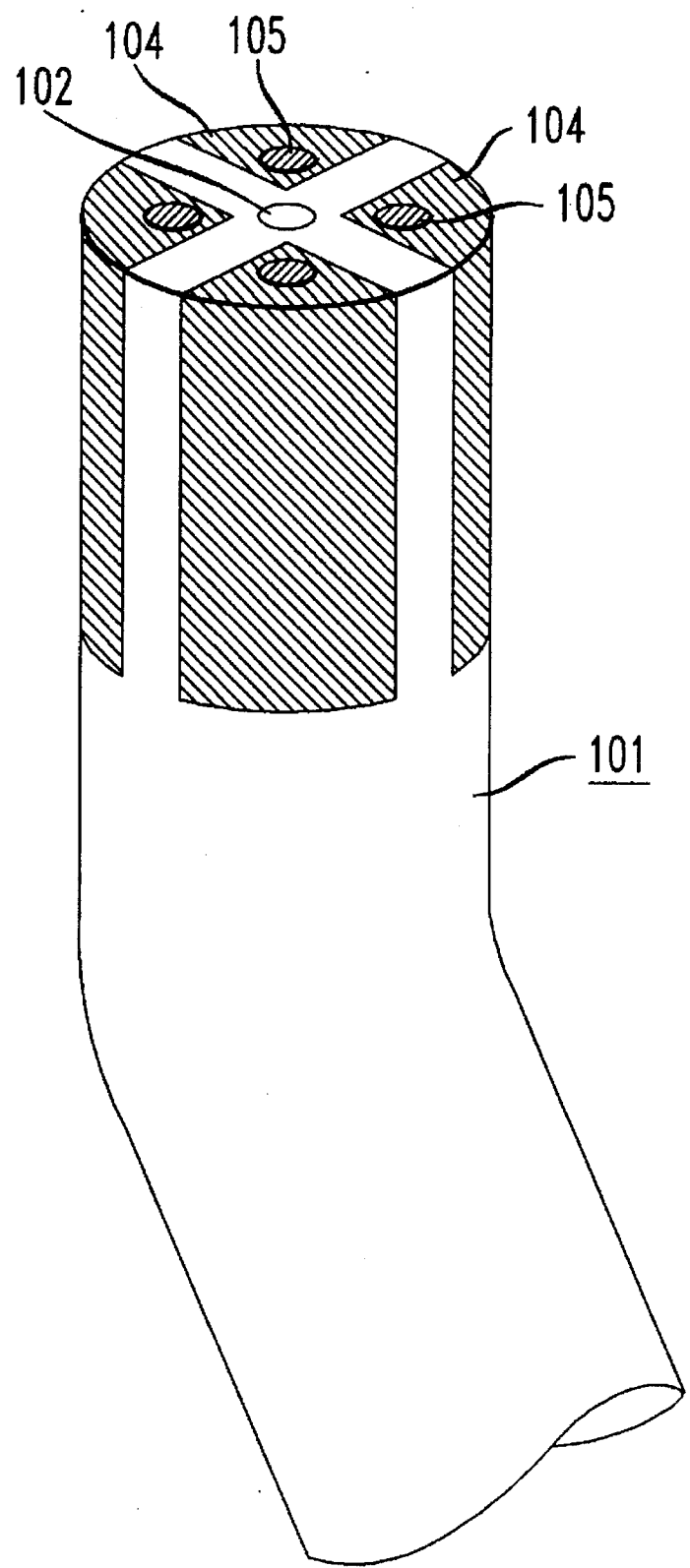
FIG. 1A shows an optical fiber having metallized contacts deposited on the face of one end of the fiber.

Shown in FIG. 1A is an optical fiber 101 onto which has been deposited one or more electrical contacts 104 (four contacts are shown) including contact areas 105. Except for the obviously smaller dimensions, the contacts can be deposited as described in FIG. 1. As will be described in FIG. 2, optical components can be bonded to the contact areas 105 of FIG. 1A in the same manner as that described for the contact areas of FIG. 1.

Figure 2:
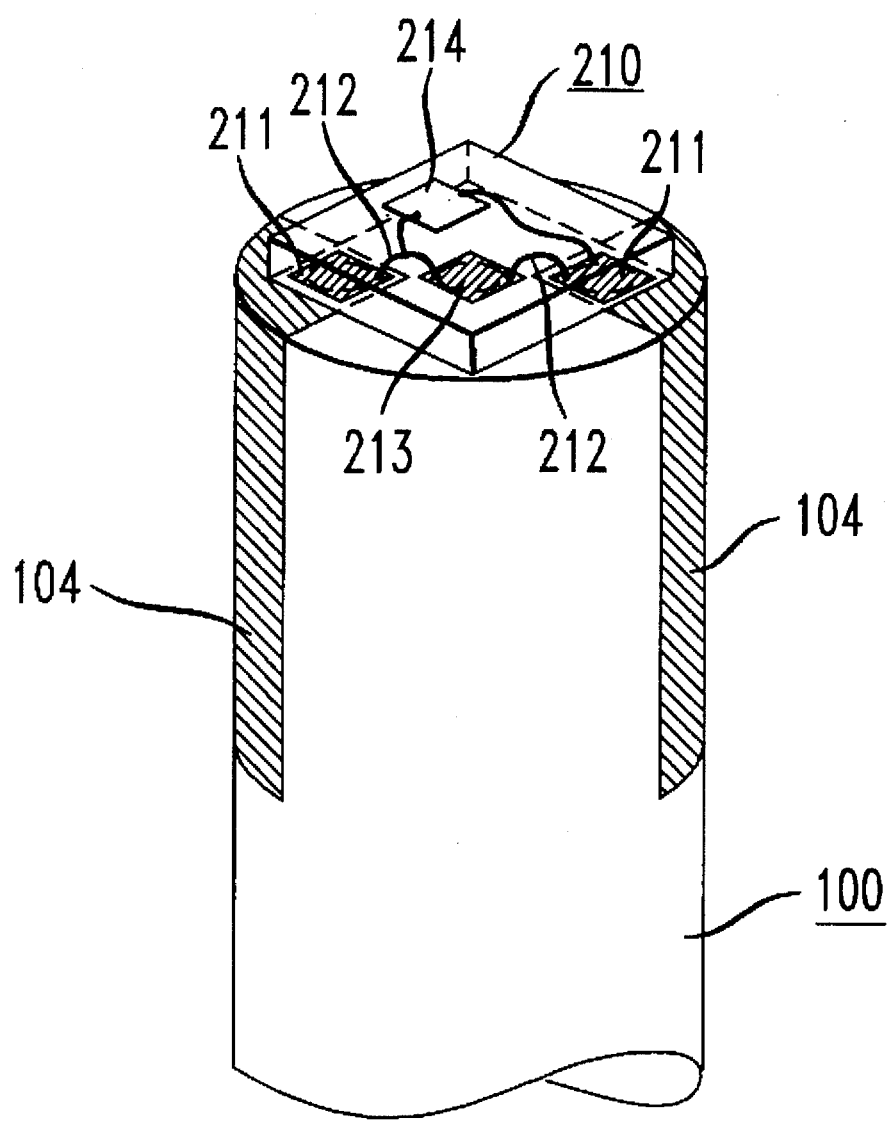
FIG. 2 shows a "see-through" drawing of an optical device connection to the contacts on the end-face of a ferrule.

FIG. 2 shows, for illustrative purposes, a see-through drawing of an optical device 210 and its connection to contact area 105 of contacts 104 on the ferrule 100. The number of contacts 104, their size, shape and location on ferrule 100 is generally determined by the optical device 210 to be mounted thereto. The optical device 210, illustratively, includes two contacts 211 having wirepath interconnections 212 to a device active area 213. The device active area 213 may illustratively be an optical laser, light-emitting diode, optical modulator, or other light-receiving or -transmitting device. If the device 210 is only an optical device which does not require any electrical power or signals, then the contacts 211 and contact area 105 of contact 104 are utilized only to align the device active area 213 to optical fiber core 102. Moreover, the portion of contact 104 which extends along a part of the length of ferrule 100 is not needed if no electrical power or signals are required by device 210 or if other means are employed to make such electrical connections to device 210. As will be discussed in a later paragraph, device 210 may be a flip-chip having solder bumps as contacts 211 enabling alignment accuracy of about 2 micro meters using standard flip-chip alignment and bonding techniques. Since device 210 would use surface-normal emitting or receiving devices to couple signals to optical fiber core 102, the device active area 213 can be made larger than the mode size of the optical fiber core 102 and still achieve good performance using the standard flip-chip alignment accuracies. While the drawing of FIG. 2 shows only two contacts on optical device 210 and ferrule 100, obviously more than two contacts can be utilized on either or both. If the optical device is a passive device (one not requiring electrical signals), then either or both the optical device 210 and ferrule 100 can be arranged to include only one support contact. Moreover, the contact on optical device 210 and ferrule 100 may be made from a non-conductive material (e.g., epoxy) or a conductive material (electrical contact or conductive epoxy).

As previously discussed, the device 210 may also be an optoelectronic device which receives power and communicates electrical signals via contacts 211 and 104 to and from external circuitry. In such an application, the contacts 211 provide for both alignment to and electrical connection with the contact areas 105 of contacts 104. According to another aspect, the device 210 may be a substrate onto which an optical component (including device active area 213) and other electronic components (e.g., 214) may be mounted and interconnected, thereby forming a hybrid optoelectronic device.

Figure 3:
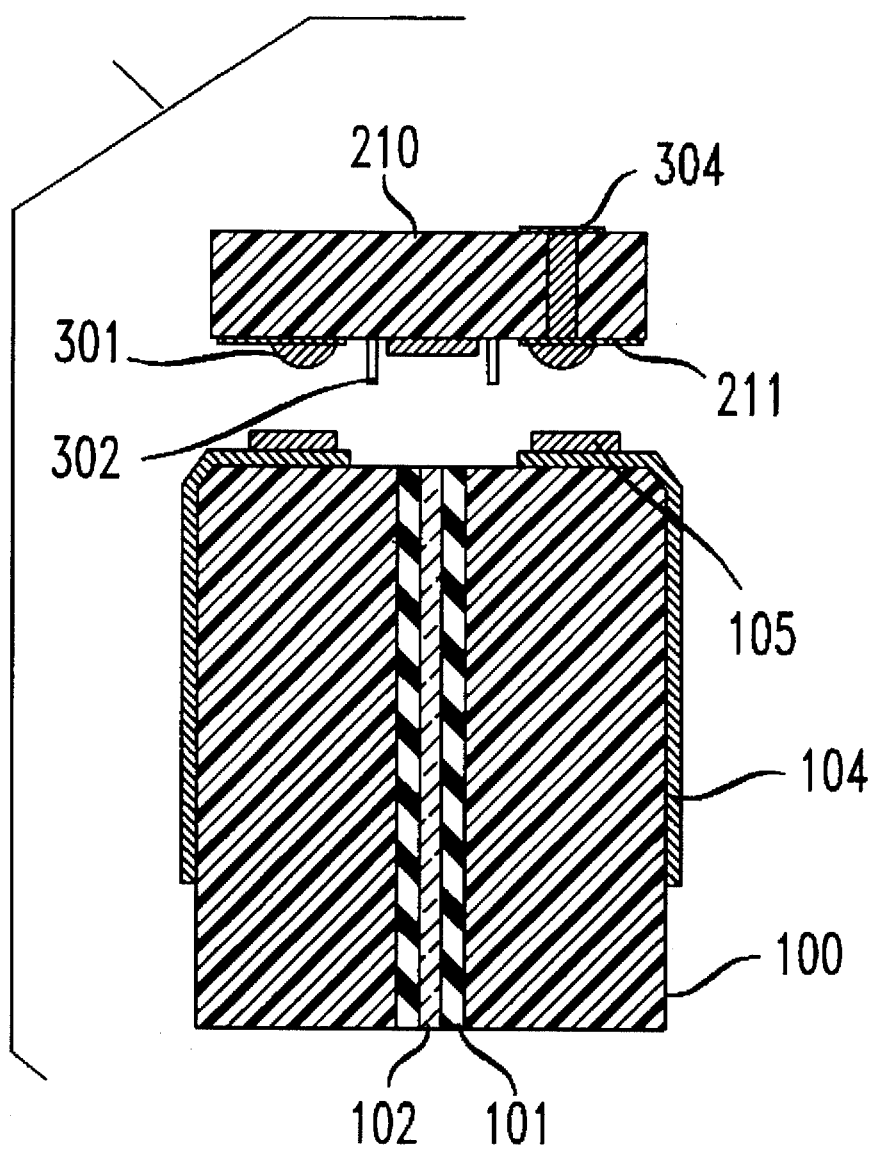
FIG. 3 shows a cross-section of an optical device having solder bumps and the optical fiber prior to the connection shown in FIG. 2.

FIG. 3 shows a cross-section of optical device 210 and ferrule 100 prior to their being bonded together. The device 210 is illustratively shown as a flip-chip type device having solder bumps 301 which serve as alignment and, if needed, electrical contacts. Illustratively, the device 210 also includes spacers 302 which advantageously control the bond separation between the device 210 and the optical fiber core 102 to more accurately control the coupling of the light signals therebetween. As previously discussed, the solder bumps 301 of the device 210 would be bonded to the contact areas 105 of contacts 104 using standard flip-chip alignment and bonding techniques. If desired, bump 301 need not be a solder bump but may be a drop of a non-conductive epoxy or other bonding agent or a drop of a conductive epoxy or other conductive bonding agent if a conductive connection is desired between the contacts of optical device 210 and ferrule 100. Furthermore, bump 301 may have other desirable properties, such as mechanical compliance, enhanced thermal expansion, etc.

In another embodiment (not shown), the contacts 211 of optical device 210 can extend beyond the edge of the ferrule (preferably by making optical device 210 wider than the ferrule 100 itself) to enable electrical connection to optical device 210. This electrical connection can be accomplished using a wire or spring contact. Alternatively, contact 211 can extend through device 210 to enable electrical contact on another surface of device 210, e.g., 304.

Figure 4:
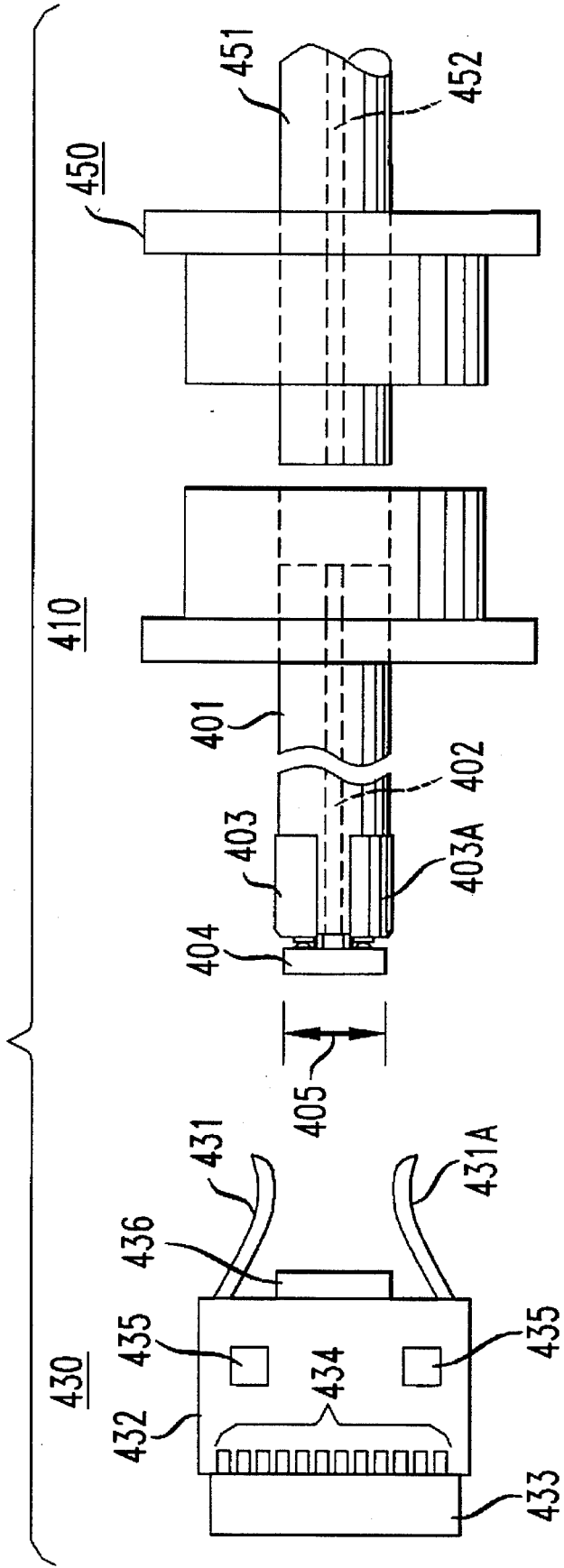
FIG. 4 shows an exploded view of an optical/electrical interconnection subsystem.

Shown in FIG. 4 is an alternative embodiment of the invention implemented as an opto/electrical interconnection subsystem including optical 410 and electrical 430 subassemblies. To facilitate an understanding of the interconnection subsystem 400, the subassemblies 410 and 430 are shown in their unassembled, uncoupled state. The subassembly 410 may be the well-known ST-type bulkhead connector, the ferrule portion 401 of which, in accordance with our invention, has contacts 403, 403A deposited thereon. The ST-type connectors are described in the AT&T Network System "Lightguide Fiber Optic Cable And Apparatus" product literature which is incorporated by reference herein. The forming of the contacts 403,403A on ferrule 401 is accomplished essentially in the same manner as was previously described in FIG. 1. The optical device 404 is shown after it has been mounted on the contact portion of contacts 403, 403A on the end of ferrule 401.

The electrical subassembly 430 includes standard wiper arms 431, 431A which are mounted and connected to control circuit 432. The wiper arms 431, 431A enable contact to the contacts 403, 403A when the ferrule 401 is inserted in the wiper arms 431, 431A. In accordance with another aspect of the invention, the wiper arm interconnection between the control circuit 432 and the metallized ferrule 401 could be implemented as a transmission line to enable a high-bandwidth connection therebetween. In general, the electrical connection to contacts 403, 403A can be made by bonding (e.g., soldering, wire bonding, conductive epoxy, or conductive polymer) or by mechanical contact (e.g., wiper contacts, spring-loaded probes, etc.). An electrical connector 433 enables external electrical connection via contacts 434 to a control circuit 432. The electrical connector may illustratively be a ribbon connector (as shown in FIG. 4), a telephone jack or connector or other well-known types of connectors used with communication circuits. Control circuit 432 is, illustratively, shown to include multiple electronic devices 435 which may interconnect to connector contacts 434 and wiper arms 431,431A to perform the desired predefined function.

A mating ST-type connector 450 enables an optical fiber 451 connection to bulkhead connector 410, thereby enabling an optical connection between the optical fiber core 452 of optical fiber 451 and optical fiber core 402 of ferrule 401. While the present invention has been described as adapted to an ST-type optical fiber connector, it should be understood that it can be readily adapted for use with other types of optical fiber connectors.

According to another embodiment of the present invention, if the optical device 404 is a passive optical device (e.g., an optical lens not requiring electrical power or signals), then wiper contacts 431 and 431A are not needed. In such an arrangement, the optoelectronic device 436 could be an optoelectronic detector to detect optical signals coupled to it by passive optical device 404 and convert the light signals into an electrical signal. Moreover, passive optical device 404 may be wavelength specific to pass certain wavelengths and attenuate or reflect other wavelengths.

According to another arrangement, optoelectronic device 436 may be an optical modulator which can reflect light signals back to passive optical device 404. In yet another arrangement, optoelectronic device 436 may be an optical signal source such as an LED or laser which produces a light signal which is coupled via passive optical device 404 to the optical fiber. In yet another embodiment, device 436 could be a device or material sensitive to certain changes in its environmental conditions, for example, temperature, vibration, pressure, chemicals, radiation, etc.

More generally, optoelectronic device 436 can perform any combination of the following conversions: light to light, light to electrical, and/or electrical to light. Illustratively, we contemplate such conversions including reflectivity, fluorescence spectra, lifetimes, non-linear responses, etc. Such conversions could be useful in optical sensor telemetry, for example.

In any of the above applications, the functions performed by device 436 can be incorporated more generally as part of device 404.

Figure 5:
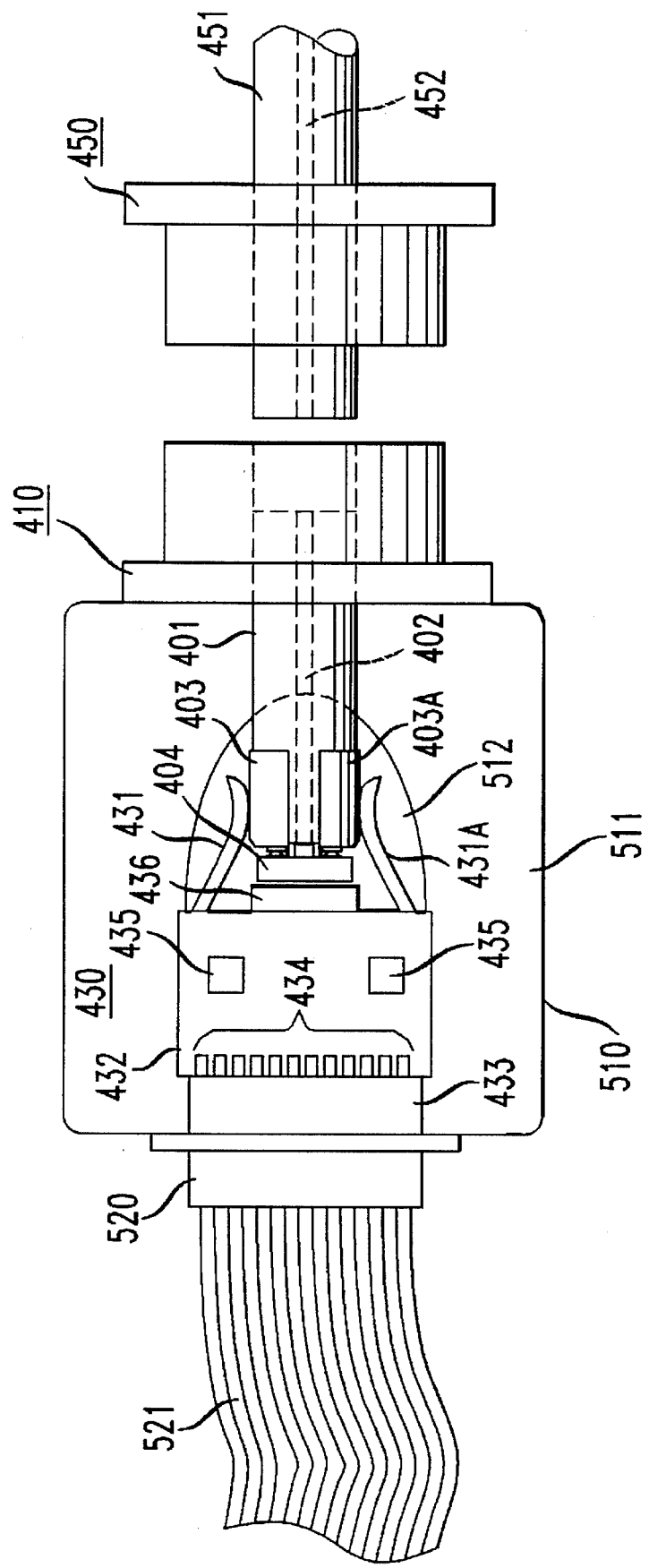
FIG. 5 shows an assembled optical/electrical interconnection subsystem.

FIG. 5 shows the optical/electrical interconnection subsystem of FIG. 4 after subassembly 410 has been assembled to subassembly 430. As assembled, the subsystem 510 enables an interconnection between electrical facility wiring (e.g., ribbon cable 521) and optical fiber 451. The assembly 511 can be molded together in one piece so as to achieve a hermetic seal around the connection between contact wipers 431,431A and contacts 403,403A. A volume 512 which may be left evacuated or filled with an inert atmosphere can also be formed within the molded subsystem 510. The advantage of the interconnection subsystem 510 is that it enables optical fiber 451 to interconnect to electrical system ribbon cable 521 with the same ease as interconnecting with other optical fibers. The interconnection subsystem 510 may be used to interface any of a variety of home/office telephone/communication facilities to optical fiber facilities.

Figure 6:
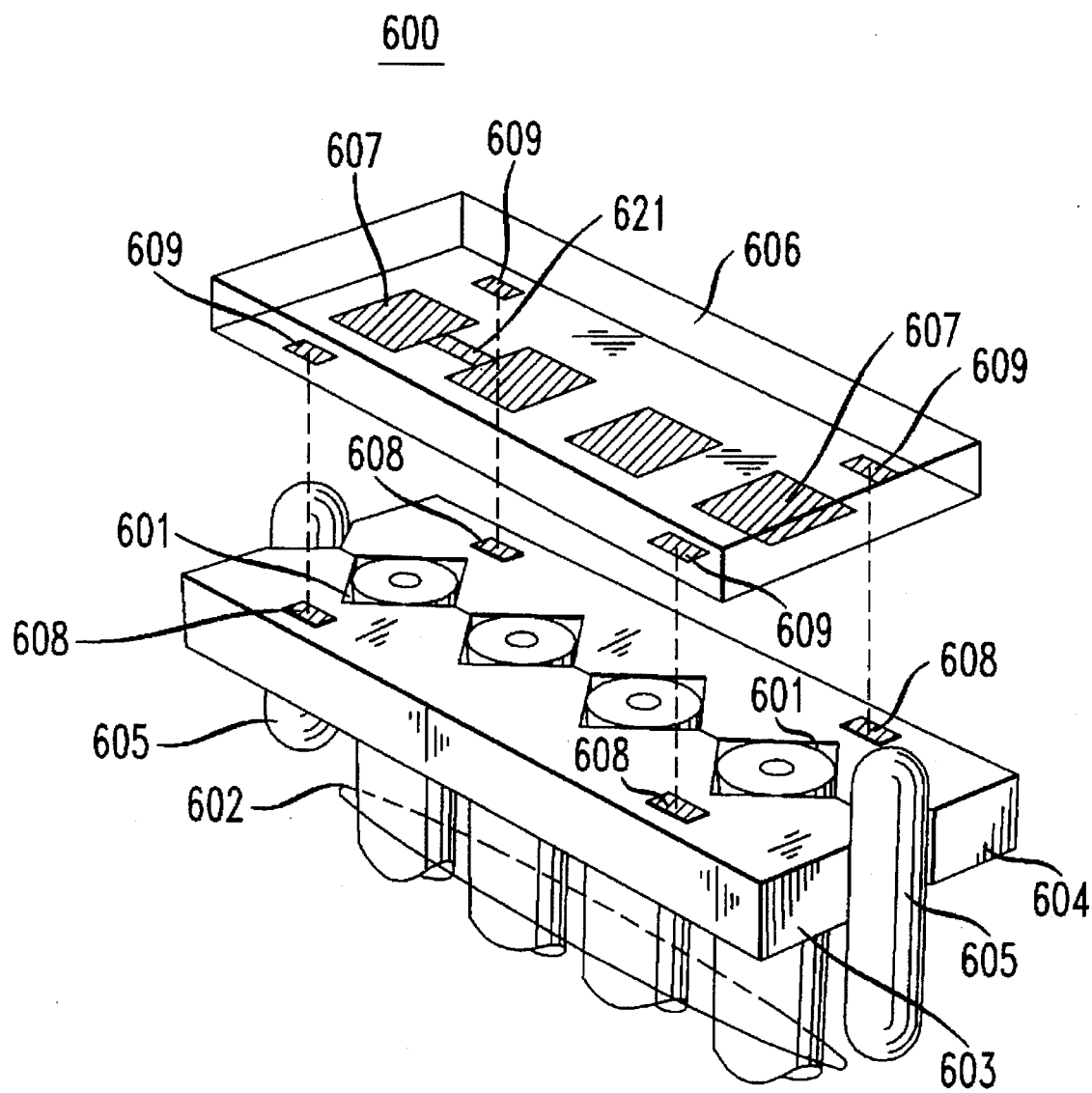
FIG. 6 shows a "see-through" drawing of an arrangement for coupling a plurality of optical fibers to a plurality of optical components.

While the invention has been described for use with a ferrule containing a single optical fiber, it is contemplated that the invention may also be utilized in a multiple optical fiber package (shown in FIG. 6) which is used to interconnect multiple optical fibers to multiple optical devices. FIG. 6, illustratively, shows a perspective drawing of a portion of the well-known AT&T MACII optical fiber cable connector 600. The individual optical fibers of the optical fiber cable 602 (e.g., a ribbon optical fiber cable) are shown mounted in the grooves 601 of the silicon wafers 603 and 604. The alignment pins 605 are used to align silicon wafers 603 and 604. Such a MACII connector is described in more detail in U.S. Pat. No. 5,430,819, Ser. No. 08/171,283, entitled "Multiple Optical Fiber Connector," filed on Dec. 21, 1993, issued on Jul. 4, 1995 by T. Sizer and J. A. Walker and incorporated by reference herein. It should be noted that the optical fiber cable 602 may be mounted in the unitary planar substrate described in the above-identified patent application.

According to this aspect of the present invention, an optical device or substrate 606, containing one or more optical components 607, can be mounted to silicon wafers 603 and 604. Some of these components may be connected by an optical waveguide 621. Either or both of the components 607 and waveguide 621 may be responsive to certain external stimuli, such as pressure, electrical signals, optical signals, etc.

Contacts 608 deposited on silicon wafers 603 and 604 align with contacts 609 on device 606. Using any of our previously identified techniques, optical device 606 can be mounted to silicon wafers 603 and 604 using the respective contacts for alignment and, if desired, for electrical contact therebetween. While four contacts are shown on device 606 and wafers 603 and 604, the number can be varied to accomplish the desired mounting configuration and the requirements for electrical interconnection therebetween. After device 606 is mounted to silicon wafers 603 and 604, the individual optical components 607 are thereby aligned to individual optical fibers of cable 602 to enable the coupling of optical signals therebetween.

Thus, what has been described is merely illustrative of the application of the principles of the present invention. Other arrangements and methods can be implemented by those skilled in the art without departing from the spirit and scope of the present invention.

We claim:

1. An arrangement for interconnecting a ferrule including an optical fiber to an optical component, comprising at least two electrically isolated contacts deposited on an end-face of a non-conductive ferrule so as not to substantially affect light being coupled to or from the optical fiber and the optical component having at least two contacts thereon which are bonded to said at least two contacts on the end-face so as to enable light to be coupled between the optical component and the optical fiber.

2. The arrangement of claim 1 wherein at least one contact on either or both the optical component and ferrule is formed from a single deposited metal.

3. The arrangement of claim 1 wherein at least one contact on either or both the optical component and ferrule is formed by depositing multiple metal layers.

4. The arrangement of claim 1 wherein the optical component includes an optical modulator.

5. The arrangement of claim 1 wherein said at least two electrical contacts on the ferrule extend from the end-face to a section along the length of the ferrule and the optical component is an optoelectronic component which communicates an electrical signal over said at least two electrical contacts.

6. The arrangement of claim 5 wherein the optical component is a passive optical device.

7. The arrangement of claim 6 wherein the passive optical device has selective wavelength characteristics.

8. The arrangement of claim 6 wherein the optical device is responsive to certain environmental stimuli.

9. The arrangement of claim 5 wherein the optoelectronic component includes a light-emitting device.

10. The arrangement of claim 5 wherein the optoelectronic component includes a light detector.

11. The arrangement of claim 1 wherein the optical component includes at least one spacer for determining the spacing between the optical component and the optical fiber core.

12. The arrangement of claim 1 wherein said at least one contact of either the optical component or ferrule includes a solder bump for alignment of the optical component to the optical fiber.

13. The arrangement of claim 1 wherein at least one contact on at least one of either the optical fiber or optical component is made of a nonconducting material.

14. The arrangement of claim 1 wherein at least one contact is a mechanically compliant material.

15. A method of interconnecting a ferrule including an optical fiber to an optical component, comprising the steps of depositing, during a single depositing step, at least one contact having a contact portion deposited on an end-face of a non-conductive ferrule so as not to substantially affect light being coupled to or from the optical fiber and bonding an optical component, including at least one contact which enables alignment, to said at least one contact portion, so as to enable light to be coupled between the optical component and the optical fiber.

16. An arrangement for interconnecting an optical fiber to an optical component, comprising at least two mounting contacts deposited directly on an end-face of the optical fiber so as not to substantially affect light being coupled to or from a core section of the optical fiber and the optical component having at least two mounting contacts thereon which are bonded to said at least two contacts on the end-face of the optical fiber so as to enable light to be coupled between the optical component and the optical fiber core.

17. An opto/electrical connector apparatus for interconnecting an optical fiber to one or more electrical facilities, comprising optical fiber connector means including a ferrule having an optical fiber located therein, said ferrule comprising a first end mounted in the optical connector means to enable connection to a mating optical fiber connector and a second end having at least two electrical contacts deposited thereon, each contact having a contact portion deposited on the end-face of the second end and extending along a section of the length of the ferrule, each contact positioned on the end-face so as not to substantially affect light being coupled to or from the optical fiber of the ferrule;

an optical component having at least two electrical contacts thereon which are bonded to said at least two contact portions on the second end so as to enable light to be coupled between the optical component and the optical fiber; and electrical connector means having a first end for connecting to a mating electrical connector having one or more electrical facilities and a second end including a plurality of contacts for electrically connecting the one or more electrical facilities to the at least two electrical contacts on the ferrule.

18. The connector apparatus of claim 17 further comprising a molded housing for encapsulating the connector apparatus except for the first end of the optical fiber connector means and the first end of the electrical connector means.

19. The connector apparatus of claim 18 wherein the molded housing does not encapsulate the plurality of contacts on the second end of said electrical connector and said at least two electrical contacts on the second end of the ferrule.

20. The connector apparatus of claim 17 wherein the optical fiber connector means is an ST-type connector.

21. An opto/electrical connector apparatus for interconnecting an optical fiber to one or more electrical facilities, comprising optical fiber connector means including a ferrule having an optical fiber located therein, said ferrule comprising a first end mounted in the optical connector means to enable connection to a mating optical fiber connector and a second end bonded to an optical lens component so as to enable light to be coupled between the optical lens component and the optical fiber; and electrical connector means having a first end for connecting to a mating electrical connector having one or more electrical facilities, and a second end connected to an opto/electrical device for interfacing the one or more electrical facilities to light passing through the optical lens component.

\* \* \* \* \*